US012799955B2

(12) United States Patent
Hans

(10) Patent No.: US 12,799,955 B2

(45) Date of Patent: Nov. 17, 2026

(54) METHOD FOR ADJUSTING AN ACTUATION OF A PROPORTIONAL VALVE FOR ITS FUNCTIONAL OPERATION AS PART OF A FLUID SYSTEM

(71) Applicant: HYDAC Fluidtechnik GmbH, Sulzbach / Saar (DE)

(72) Inventor: Patrick Hans, Saarbrücken (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 281 days.

(21) Appl. No.: 18/571,372

(22) PCT Filed: Jun. 1, 2022

(86) PCT No.: PCT/DE2022/100411

§ 371 (c)(1),
(2) Date: Dec. 18, 2023

(87) PCT Pub. No.: WO2022/268254

PCT Pub. Date: Dec. 29, 2022

(65) Prior Publication Data

US 2024/0426327 A1 Dec. 26, 2024

(30) Foreign Application Priority Data

Jun. 23, 2021 (DE) ..................... 10 2021 003 236.5

(51) Int. Cl.

*G01F 25/10* (2022.01)
*F15B 19/00* (2006.01)

(52) U.S. Cl.

CPC .................................. *F15B 19/002* (2013.01)

(58) Field of Classification Search

CPC ......... F15B 19/002; G01F 25/00; G01F 25/10

USPC ..... 251/42, 60, 129.8, 285, 307; 702/45, 85, 702/100; 73/1.01, 1.16, 1.34–1.36, 1.72; 701/50

See application file for complete search history.

(56) References Cited

U.S. PATENT DOCUMENTS

| | | | | |
|---|---|---|---|---|
| 6,347,517 B1 | 2/2002 | Sereni | | 60/459 |
| 6,401,456 B1 | 6/2002 | Moriya | | 60/433 |
| 2005/0171668 A1 | 8/2005 | Allerding | | 701/50 |
| 2018/0142709 A1 | 5/2018 | Kondo et al. | | F15B 11/10 |

FOREIGN PATENT DOCUMENTS

| | | | |
|---|---|---|---|
| DE | 699 10 948 | 5/2004 | A01B 63/114 |
| DE | 10 2019 000212 | 7/2020 | F15B 11/08 |

OTHER PUBLICATIONS

Search Report for International Application No. PCT/DE2022/100411, 5 pages, Aug. 16, 2022.

*Primary Examiner* — Robert R Raevis

(74) *Attorney, Agent, or Firm* — Slayden Grubert Beard PLLC

(57) ABSTRACT

Disclosed is a method for adjusting an actuation of a proportional valve (10) for its functional operation as part of a fluid system (14), comprising the following steps: acquiring measurements of the proportional valve (10) during its operation outside the fluid system (14); preparing a characteristic diagram (12) based on the measurements; integrating the proportional valve (10) into the fluid system (14), and adapting the actuation of the proportional valve (10) to the fluid system (14) on the basis of the characteristic diagram (12) by means of a control device (18). A corresponding fluid system (14) and an industrial truck with such a fluid system (14) are also disclosed.

21 Claims, 2 Drawing Sheets

METHOD FOR ADJUSTING AN ACTUATION OF A PROPORTIONAL VALVE FOR ITS FUNCTIONAL OPERATION AS PART OF A FLUID SYSTEM

CROSS-REFERENCE TO RELATED APPLICATIONS

This application claims priority to German Patent Application No. DE 10 2021 003 236.5, filed on Jun. 23, 2021 with the German Patent and Trademark Office. The contents of the aforesaid patent application are incorporated herein for all purposes.

FIELD

The disclosure relates to a method for adjusting an actuation of a proportional valve for its functional operation as part of a fluid system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

DE 10 2019 000 212 A1 discloses a method for operating a circuit arrangement for load-optimised lowering of loads by means of a fluidically driveable operating device. A proportional pressure limiting valve is arranged in the return of the circuit arrangement designed as a fluid system, said valve being used to adjust a lowering speed for a respective load. A control device for the circuit arrangement, in which a characteristic diagram for the proportional pressure limiting valve is stored, calculates a setpoint selection for actuating the proportional pressure limiting valve as a function of a setpoint specified by an operator, the current speed of the operating device and a pressure resulting from the load on the operating device.

SUMMARY

A need exists to provide a method enabling to integrate a proportional valve in a fluid system accurately, simply and cost-effectively. The need is addressed by the subject matter of the independent claim(s). Embodiments of the invention are described in the dependent claims, the following description, and the drawings.

DESCRIPTION

Figure 1:
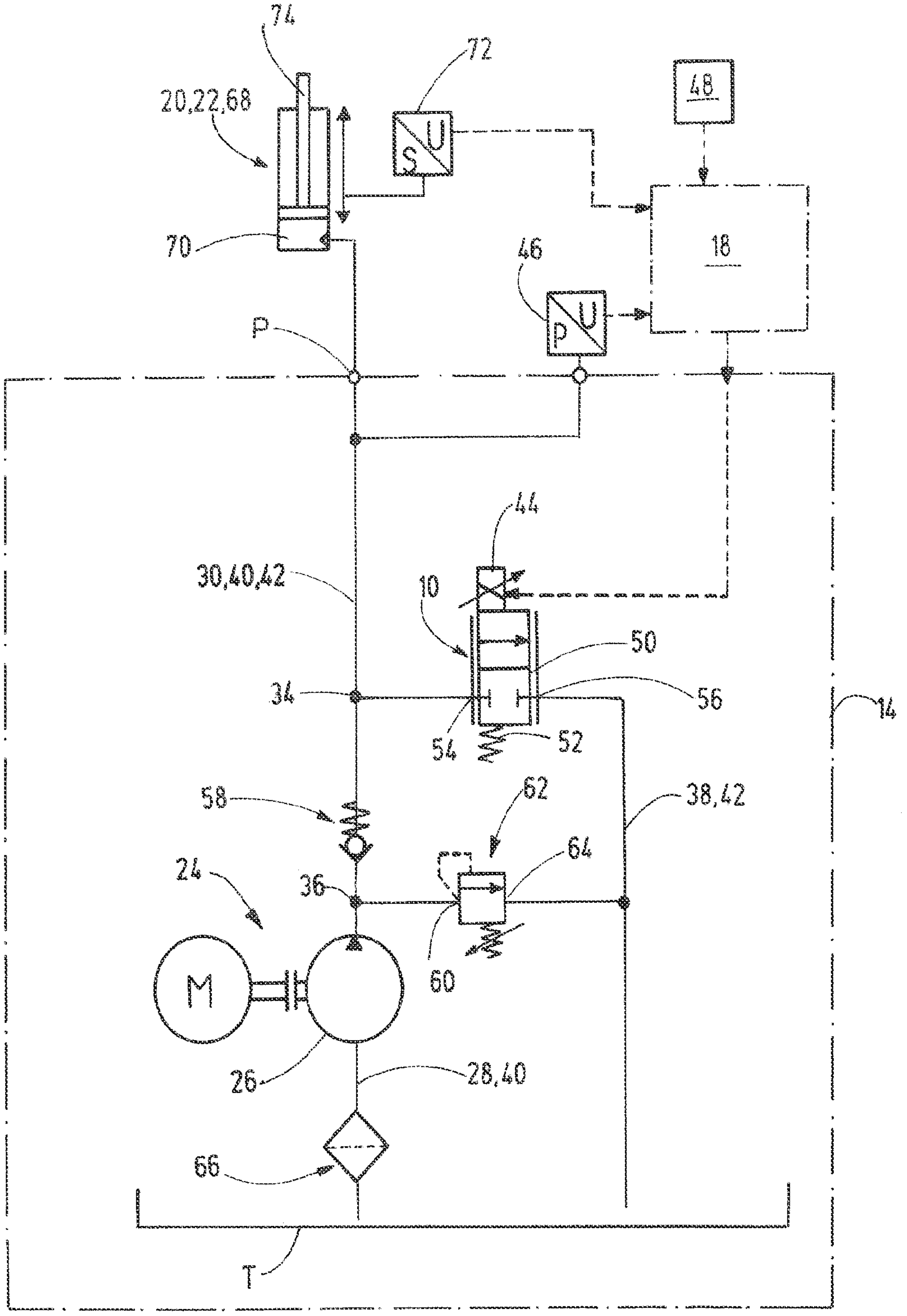
FIG. 1 shows an example fluid system which comprises a proportional valve in the form of a hydraulic circuit diagram.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

It was initially acknowledged that a manufacturer of a fluid system connecting a proportional valve in a fluid-conveying manner to a fluid system needs to adjust the actuation of the proportional valve to the fluid system by means of training before the fluid system is used for the first time. This is achieved by an operator actively configuring the control device of the fluid system and, in some cases, by a trial operation, which can be expensive and time-consuming.

Furthermore, it was also acknowledged that the operating properties of identically designed proportional valves of the same type from a manufacturer differ at least slightly from one another due to manufacturing tolerances, especially hydraulic and/or electrical manufacturing tolerances. Thus, for example, when actuating two proportional valves with the same current value at the same pressure at the inlet port of each proportional valve, the flow through one proportional valve can be distinguished from the flow through the other proportional valve. In the same way, a change in the pressure at the inlet port of each proportional valve with the same current value for actuation may result in a change in flow in one proportional valve which differs from the flow through the other proportional valve. As a result, in order to obtain the same flow, all proportional valves of the same type from one manufacturer are shown as actuatable or otherwise by means of a single characteristic curve, it is expected that, when actuating all proportional valves of the same type from one manufacturer with the same current value, the flows of two proportional valves will differ at least slightly from one another.

These conditions are taken into account in some embodiments, in which a method for adjusting an actuation of a proportional valve for its functional operation as part of a fluid system comprises the following method steps: acquiring measurements of the proportional valve during its operation outside the fluid system; preparing a characteristic diagram based on the measurements; integrating the proportional valve into the fluid system; and adapting the actuation of the proportional valve to the fluid system on the basis of the characteristic diagram by means of a control device.

In this case, integration of the proportional valve in the fluid system is synonymous with connecting the proportional valve to the fluid system in a fluid-conveying or electrical manner for its functional operation in the fluid system, whereas operation of the proportional valve outside this fluid system is synonymous with a proportional valve that is not connected to the fluid system in a hydraulic and electrical manner, in other words is thus separate.

The aforementioned process steps avoid the need for an expensive and time-consuming active adjustment of the proportional valve to the fluid system in which the proportional valve is integrated by means of training by the manufacturer of the fluid system. Thus, all proportional valves are regularly subjected to an end-of-line test by their manufacturer, in which each proportional valve is checked, at least in sections, for functionality over its entire possible operating range, which may exceed a required operating range when using the proportional valve in a respective fluid system. As part of the end-of-line test, measurements are collected over the entire possible operating range of the proportional valve and these are stored as a characteristic diagram for a respective proportional valve. An individual characteristic diagram belonging to each proportional valve can be retrieved by the manufacturer of the fluid system for use in the control device of their fluid system for adapted actuation of the proportional valve to the fluid system. In this process, for the purpose of adjustment by the control device, at least one characteristic curve in the required operating range of the proportional valve for this purpose is selected automatically, this being part of the entire possible operating range of the proportional valve. A corresponding adjustment is not only performed when using the fluid system for the first time but can also be performed when changing the pressure range at the inlet port of the proportional valve during operation of the fluid system. This can be regarded as independent, valve-specific configuration of the control device without any active involvement by an operator, thus saving time and cost.

Furthermore, the actuation signal for the proportional valve issued by the control device can be adjusted with a particularly high resolution to said valve, thus allowing a controlled and accurate regulation of the movement sequence of the at least one piston rod of the operating device.

In some embodiments, it is provided that, outside the fluid system, the measurements of a flow through the proportional valve are acquired as a function of a variable actuation current of an actuating device of the proportional valve in at least one predefined pressure range at the inlet port of the proportional valve. On this basis, it is for example provided that the characteristic diagram for each pressure range at the inlet port of the proportional valve comprises a characteristic curve for the flow through the proportional valve as a function of the actuation current of the actuating device for the proportional valve. This configuration is based on the fact that the flow, i.e., the volume flow, though the proportional valve is substantially dependent on the fluid pressure at the inlet port of the proportional valve and the opening cross-section of the proportional valve, which is in turn dependent on its actuation current.

In some embodiments, it is provided that the proportional valve is actuated by the control device as a function of a setpoint specified by a person operating the fluid system using a respective characteristic curve from the characteristic diagram, said curve being suited to operation of the proportional valve in the fluid system in each case. For example, in this case it is provided that an operating device is connected, particularly directly, to the proportional valve integrated in the fluid system and that adjusting the actuation accordingly takes place in that the characteristic curve from the characteristic diagram most suited to operation of the proportional valve in the fluid system is selected based on the measured load pressure at the inlet port of the proportional valve. Also, the association between the respective proportional valve and its characteristic diagram is established by means of a unique identifier, which is for example connected permanently to the proportional valve. The corresponding features further support the cost and time-saving adjustment of actuation of the proportional valve to the fluid system, which only requires minimal activities on the part of an operator.

In some embodiments, it is provided that measurements of the displacement path and/or the displacement speed of a piston rod of the operating device are acquired and that these measurements are also used when actuating the proportional valve. As a result, the functional safety of the fluid system, particularly the desired change in movement of the at least one piston rod of the operating device, is improved and the accuracy of actuation of the proportional valve is increased. This thus provides the option of a closed control circuit.

In some embodiments, it is provided that a displacement movement of a piston rod of at least one operating cylinder of the operating device is controlled within adjustment limits (expected values) after integrating the proportional valve in the fluid system, particularly after adjusting the actuation. The training that takes place in some cases in the prior art after this control operation and/or the trial operation of the proportional valve can be omitted.

In some embodiments, it is provided that the fluid used is a hydraulic fluid, such as hydraulic oil, for example, and all components of the hydraulic fluid system, in particular the proportional valve, are hydraulic components.

In some embodiments, a fluid system for fluidic actuation of an operating device is provided, which can be supplied with a fluid at a predefinable pressure for lifting a load by a motor pump unit via a feed, having a return for removing fluid from the operating device when lowering said load, in which return a proportional valve is connected, in particular to adjust the lowering speed.

Actuation of the proportional valve is adjusted for its functional operation as part of the fluid system by means of the aforementioned method.

In some embodiments, it is provided that the return is otherwise free from flow cross-section restricting means, particularly those which are variably adjustable. In comparison with the prior art, at least one valve in the return can accordingly be saved as a result, by virtue of which the fluid system, particularly in block construction, can be designed in a space-saving manner and lowering the load can be performed in a manner that is optimised to dynamic pressure. Furthermore, the proportional valve can be used more effectively within its technical limitations.

In some embodiments, an industrial truck is provided having a fork, an operating device that has at least one operating cylinder, by means of which the fork can be moved, and an aforementioned hydraulic fluid system for actuating the respective operating cylinder.

The method according to the teachings herein for adjusting an actuation of a proportional valve for its functional operation as part of a fluid system is explained further below with the aid of the drawings, which are shown in outline and not to scale.

Specific references to components, process steps, and other elements are not intended to be limiting. Further, it is understood that like parts bear the same or similar reference numerals when referring to alternate FIGS.

A manufacturer of a proportional valve 10 regularly carries out an end-of-line test on all proportional valves 10 that they manufacture. In this test, the manufacturer checks the functionality of each proportional valve 10 in its entire possible operating range. During the end-of-line test on the respective proportional valve 10, measurements are collected by the manufacturer of said valve. A characteristic diagram 12 is prepared for each proportional valve 10 using the measurements, the operating behaviour of the proportional valve 10 in its entire operating range being deduced from said characteristic diagram. The characteristic diagrams 12 for all proportional valves 10 are stored centrally by the manufacturer of the proportional valve 10, for example on a server.

If a respective proportional valve 10 is integrated in the fluid system 14 by a manufacturer of a fluid system 14 after delivery of said valve, the manufacturer of the fluid system 14 can retrieve the characteristic diagram 12 belonging to this proportional valve 10 from the server of the proportional valve manufacturer and implement said diagram in a control device 18 for the fluid system 14. In this case, there is a distinction between the manufacturer of the fluid system 14 and the manufacturer of the proportional valve 10. The association between the proportional valve 10 and its characteristic diagram 12 is established by means of a unique identifier, which is attached to the valve 10, such as, for example, a QR (quick response) code or a character string, and by this means the manufacturer of the fluid system 14 gains access to the characteristic diagram 12 of the proportional valve 10 that they are using. The proportional valve 10 can only be actuated in accordance with the operating range required in this fluid system 14 by means of at least one characteristic curve 16 of the characteristic diagram 12, without the need for an operator to configure the control device 18 of the fluid system 14 in this respect and/or trial operation of the proportional valve 10.

The respective fluid system 14 in which the proportional valve 10 is used can be designed in the same way as the fluid system 14 shown in FIG. 1. This fluid system 14 is for example used in industrial trucks to control operating cylinders 20 in the form of lifting cylinders 22 for hoists, such as lifting forks, for lifting and lowering loads. Gravity-induced lowering of raised loads takes place via a lowering valve 10, in this case in the form of the proportional valve 10.

The fluid system 14 comprises a motor pump unit 24, the pump 26 of which is connected with its suction side in a fluid-conveying manner via a first fluid line 28 to a fluid storage tank T and with its high pressure side via a second fluid line 30 to a pressure supply port P of the fluid system 14. A first branch point 34 is provided in the second fluid line 30, a return line 38 leading to the tank T being connected to said branch point and the electromagnetically actuatable proportional valve 10 being connected to said return line.

A feed 40 of the fluid system 14 is formed by the fluid path originating from the tank T via the first fluid line 28, the pump 26 and the second fluid line 30 up to the pressure supply port P. A return 42 of the fluid system 14 is formed by the fluid path originating from the pressure supply port P via one part of the second fluid line 30 and the return line 38, to which the proportional valve 10 is connected, up to the tank T. The return 42 thus differs at least partially from the feed 40 in this way. The entire fluid path 42, with the exception of the proportional valve 10, is free from devices for restricting the flow cross-section, which may be designed such that they are variably adjustable and/or actuatable from outside.

A solenoid actuating device 44 of the proportional valve 10 can be actuated by the electronic control device 18 of the fluid system 14. Measurements from a pressure sensor 46, which records the fluid pressure in the second fluid line 30, and setpoint values from an input device 48, such as a joystick, for example, for entering lifting and lowering commands by an operator are supplied to the control device 18.

The proportional valve 10 is designed as a 2/2-way proportional valve 10. The valve piston 50 of the proportional valve 10 can be moved by means of the actuating device 44 against the force of a compression spring 52 from a first end position shown in the FIG. into a second end position. In the first end position shown in the figure, the valve piston 50 of the valve 10 separates its inlet port 54 and outlet port 56 from one another, which the valve piston 50 connects to one another fluidically via a fluid path in the second end position. The inlet port 54 of the proportional valve 10 is connected to the first branch point 34 and the outlet port 56 is connected to the tank T, for example directly in each case. For example, the branch point 34 corresponds to the pressure supply port P.

A non-return valve 58 is connected between the first branch point 34 and the pump 26 in the second fluid line 30, said valve opening against the force of a compression spring in the direction of the pressure supply port P. The non-return valve 58 prevents fluid flowing back from the pressure supply port P via the pump 26 towards the tank T. A second branch point 36 is provided in the second fluid line 30 between the non-return valve 58 and the pump 26. An inlet port 60 of a pressure limiting valve 62 is connected in a fluid-conveying manner to the second branch point 36, the outlet port 64 of said valve being connected in a fluid-conveying manner to the return line 38 between the proportional valve 10 and the tank T. The pressure limiting valve 62 protects the second fluid line 30 from inadmissible excess pressure towards the tank T. A suction filter 66 is connected in the first fluid line 28.

The operating cylinder 20 of a fluidically driveable operating device 68 is connected to the fluid system 14. In addition, a piston-side operating chamber 70 of the operating cylinder 20 is connected in a fluid-conveying manner, particularly permanently, to the pressure supply port P, for example without any flow cross-section restricting means connected in between, for example connected directly. The piston-side operating chamber 70 of the operating cylinder 20 is supplied with a fluid at a pre-definable pressure to lift a load via the feed 40 of the fluid system 14 and relieved to lower the load by discharging fluid from the piston-side operating chamber 70 via the return 42 of the fluid system 14 towards the tank T. The proportional valve 10, which may take the form of a slide or seat design, acts as a lowering valve 10 in this instance. Lowering a raised load via the pump 26 is prevented by means of the non-return valve 58 and the pressure limiting valve 62 provides protection against lifting loads that are too heavy.

In addition to the measurements from the pressure sensor 46, which correspond to the load pressure p of a respective load, measurements from a displacement sensor 72 can be supplied to the control device 18, said displacement sensor recording the displacement path and/or the displacement speed of a piston rod unit 74 of the operating cylinder 20. These measurements are also used to actuate the proportional valve 10.

The fluid system 14 and the operating device 68, the two sensors 46, 72, the control device 18 and the inlet device 48 are part of an industrial truck, which is not shown in the FIGS., such as, for example, a forklift truck, which comprises a fork to receive loads, said fork being able to move up and down by means of the operating cylinder 20 in the form of a lifting cylinder 22.

With regard to use of the proportional valve 10 in the fluid system 14 described above, as part of the end-of-line test, the manufacturer of the proportional valve 10 collects measurements of the flow Q through the proportional valve 10 as a function of a variable actuation signal in the form of the actuation current I of the actuating device 44 of the proportional valve 10 in a plurality of pressure ranges at the inlet port 54 of the proportional valve 10. In this process, application limits for the proportional valve 10, such as, for example, an actuation current value for a minimum flow Q through the proportional valve 10, an actuation value I for a maximum flow Q and the resolution of the opening cross-section adjustment of the proportional valve 10, can be calculated.

Figure 2:
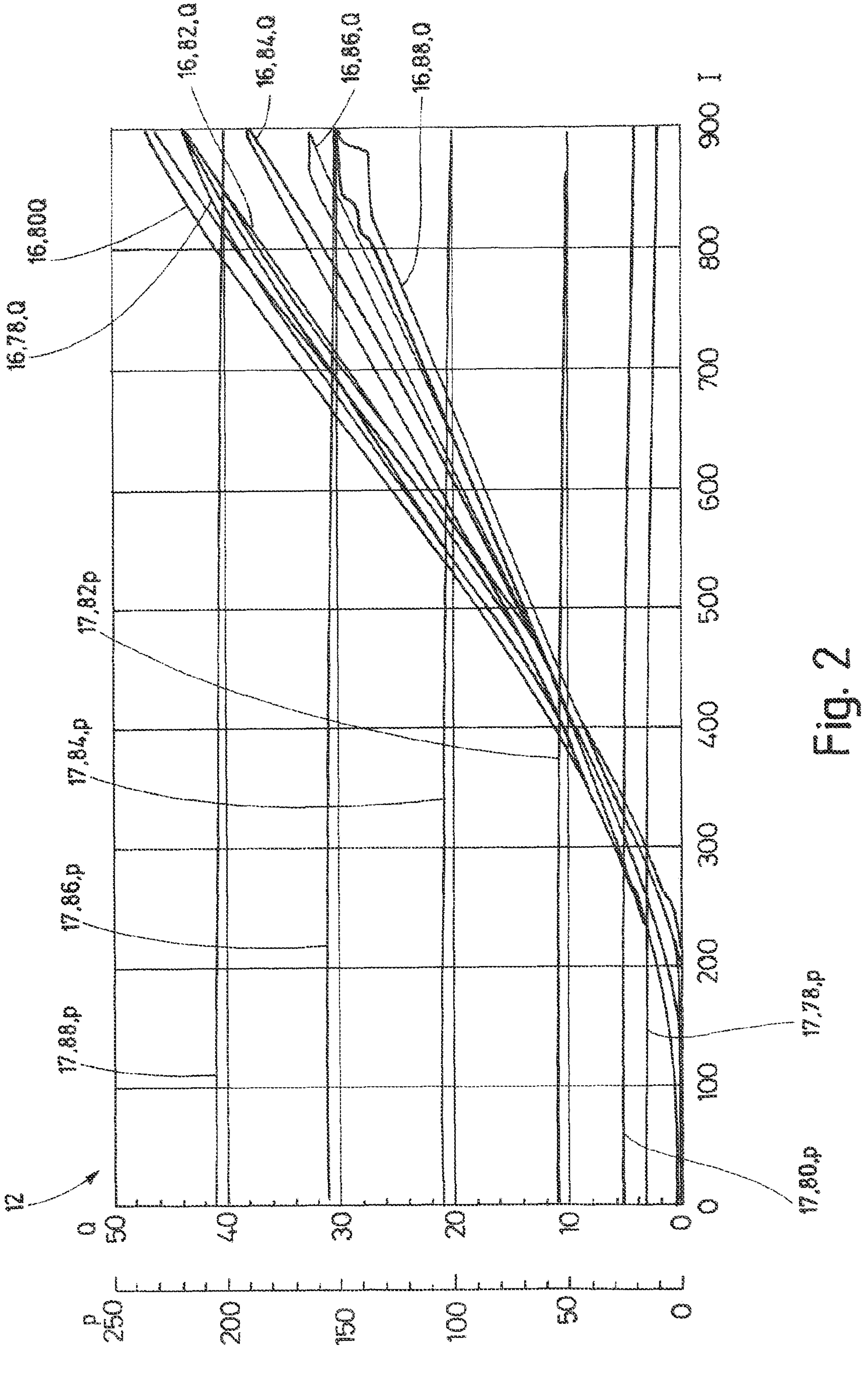
FIG. 2 uses a Cartesian coordinate system to show a characteristic diagram stored in a control device of the fluid system of FIG. 1 to actuate the proportional valve, in which a pressure at the inlet port of the proportional valve and a flow through the proportional valve are plotted over an actuation current of the proportional valve.

Accordingly, the characteristic diagram 12 shown in FIG. 2 comprises, for each pressure range, a characteristic curve 16 for the flow Q [litres/minute] and a further characteristic curve 17 for the fluid pressure p [bar], as a function of the actuation current I [milliamps] in each case. The pressure ranges, as shown in FIG. 2, may, for example, be provided at approximately 10 bar (reference numeral 78), 20 bar (reference numeral 80), 50 bar (reference numeral 82), 100 bar (reference numeral 84), 150 bar (reference numeral 86) and 200 bar (reference numeral 88).

After connecting the proportional valve 10 to the fluid system 14 in a fluid-conveying manner, the manufacturer of the fluid system 14 retrieves the characteristic diagram 12 belonging to the proportional valve 10 from the manufacturer of the proportional valve 10 by means of the unique identifier and transfers it to the control device 18 of the fluid system 14. The control device 18 then automatically, based on the measured load pressure p of a respective load, selects the most appropriate characteristic curve 16 from the characteristic diagram 12 in this load pressure range, as a result of which actuation of the proportional valve 10 is adjusted to the fluid system 14 in a valve-specific and automatic manner. As a result, this allows for a particularly well adapted resolution of the actuation current I to the proportional valve 10.

If an operator of the fluid system 14 inputs a command to lower the load by the input means 48, which corresponds to a specific displacement path and/or a specific displacement speed of the piston rod unit 74 of the operating cylinder 20 and thus a specific opening cross-section of the proportional valve 10 or flow Q through the proportional valve 10 respectively, the necessary valve-specific actuation current I: required to execute this command is calculated via the selected characteristic curve 16 and issued by the control device 18 to the actuating device 44 of the proportional valve 10, in particular to adjust the lowering speed of the load. As a result, this allows a particularly accurate and controlled regulation of the movement sequence of the piston rod unit 74 of the operating device 68. The actuation current I may be a pulse-width-modulation current signal (PWM signal). The load is lifted by operating the pump 26 as in the prior art.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for adjusting an actuation of a proportional valve for its functional operation as part of a fluid system, comprising:

acquiring measurements of the proportional valve during its operation outside the fluid system;

preparing a set of characteristic curves based on the measurements, the set of characteristic curves comprising a plurality of characteristic curves;

integrating the proportional valve into the fluid system;

selecting a first characteristic curve of the set of characteristic curves;

adapting the actuation of the proportional valve to the fluid system on the basis of the first characteristic curve using a control device; wherein each characteristic curve represents a full hysteresis loop.

2. The method of claim 1, wherein acquiring measurements and preparing the set of characteristic curves are performed upon manufacture of the proportional valve and adapting the actuation is performed upon manufacture of the fluid system.

3. The method of claim 2, comprising:

storing the set of characteristic curves of the proportional valve;

retrieving the set of characteristic curves associated with the proportional valve integrated in the fluid system; and transferring the set of characteristic curves to a control device for the fluid system.

4. The method of claim 2, wherein, outside the fluid system, measurements of a flow through the proportional valve are acquired as a function of an actuation signal of an actuating device of the proportional valve in at least one predefined pressure range at the inlet port of the proportional valve.

5. The method of claim 2, wherein the set of characteristic curves for at least one pressure range at the inlet port of the proportional valve comprises at least one characteristic curve for the flow through the proportional valve as a function of the actuation signal of the actuating device of the proportional valve.

6. The method of claim 1, comprising:

storing the set of characteristic curves of the proportional valve upon manufacture of the proportional valve;

retrieving the set of characteristic curves associated with the proportional valve integrated in the fluid system upon manufacture of the fluid system; and transferring the characteristic curves to the control device for the fluid system.

7. The method of claim 6, wherein, outside the fluid system, measurements of a flow through the proportional valve are acquired as a function of an actuation signal of an actuating device of the proportional valve in at least one predefined pressure range at the inlet port of the proportional valve.

8. The method of claim 6, wherein the set of characteristic curves for at least one pressure range at the inlet port of the proportional valve comprises at least one characteristic curve for the flow through the proportional valve as a function of the actuation signal of the actuating device of the proportional valve.

9. The method of claim 1, wherein, outside the fluid system, measurements of a flow through the proportional valve are acquired as a function of an actuation signal of an actuating device of the proportional valve in at least one predefined pressure range at the inlet port of the proportional valve.

10. The method of claim 9, wherein the set of characteristic curves for at least one pressure range at the inlet port of the proportional valve comprises at least one characteristic curve for the flow through the proportional valve as a function of the actuation signal of the actuating device of the proportional valve.

11. The method of claim 1, wherein the set of characteristic curves for at least one pressure range at the inlet port of the proportional valve comprises at least one characteristic curve for the flow through the proportional valve as a function of the actuation signal of the actuating device of the proportional valve.

12. The method of claim 1, wherein the proportional valve is actuated by the control device as a function of a setpoint specified during operating the fluid system using the first characteristic curve from the set of characteristic curves, said first characteristic curve being suited to operation of the proportional valve in the fluid system.

13. The method of claim 1, wherein an operating device is connected to the proportional valve integrated into the fluid system and wherein adjusting the actuation accordingly takes place in that the first characteristic curve from the set of characteristic curves suited to operation of the proportional valve in the fluid system is selected based on the measured load pressure at the inlet port of the proportional valve.

14. The method of claim 13, wherein measurements of the displacement path and/or the displacement speed of at least one piston rod of the operating device are acquired and wherein the measurements are used when actuating the proportional valve.

15. The method of claim 13, wherein a displacement movement of the operating device is controlled within adjustment limits.

16. The method of claim 1, wherein the association between the respective proportional valve and its set of characteristic curves is established using a unique identifier.

17. A fluid system for fluidic actuation of an operating device, which can be supplied with a fluid at a predefinable pressure for lifting a load by a motor pump unit via a feed, having a return for removing fluid from the operating device when lowering said load, in which return a proportional valve is connected, wherein an actuation of the proportional valve for its functional operation as part of the fluid system is adjusted by:

acquiring measurements of the proportional valve during its operation outside the fluid system;

preparing a set of characteristic curves based on the measurements, the set of characteristic curves comprising a plurality of characteristic curves;

integrating the proportional valve into the fluid system;

selecting a first characteristic curve of the set of characteristic curves; and adapting the actuation of the proportional valve to the fluid system on the basis of the first characteristic curve using a controller; wherein each characteristic curve represents a full hysteresis loop.

18. The fluid system of claim 17, wherein the return is otherwise free from flow cross-section restricting means.

19. The fluid system of claim 17, wherein the proportional valve is configured as an electromagnetically actuatable 2/2-way proportional valve.

20. An industrial truck having a fork and an operating device that has at least one operating cylinder using which the fork can be moved, wherein a fluid system of claim 17 is provided for actuating the respective operating cylinder.

21. A method for adjusting an actuation of a proportional valve for its functional operation as part of a fluid system, comprising:

acquiring measurements of the proportional valve during its operation outside the fluid system;

preparing a characteristic diagram based on the measurements;

integrating the proportional valve into the fluid system; and adapting the actuation of the proportional valve to the fluid system on the basis of the characteristic diagram using a control device; wherein an operating device is connected to the proportional valve integrated into the fluid system and wherein adjusting the actuation accordingly takes place in that the characteristic curve from the characteristic diagram suited to operation of the proportional valve in the fluid system is selected based on the measured load pressure at the inlet port of the proportional valve.

* * * * *